(12) United States Patent
Bell, Jr. et al.

(10) Patent No.: US 6,502,503 B1
(45) Date of Patent: Jan. 7, 2003

(54) COOKING SYSTEM

(76) Inventors: Patrick W. Bell, Jr., P.O. Box 73, Duplessis, LA (US) 70728; Andrew H. Chustz, 18427 Perkins Oak Rd., Prairieville, LA (US) 70769; Brady L. Bell, 5711 Preston Oaks, #1217, Dallas, TX (US) 75240

( * ) Notice: Subject to any disclaimer, the term of this patent is extended or adjusted under 35 U.S.C. 154(b) by 0 days.

(21) Appl. No.: 10/133,507

(22) Filed: Apr. 26, 2002

(51) Int. Cl.[7] .......................... A47J 37/04; A47J 37/07; A47J 37/10; A47J 43/18
(52) U.S. Cl. .......................... 99/419; 99/345; 99/418; 99/426; 99/448
(58) Field of Search .................. 99/345–347, 415–418, 99/419–421 U, 425, 426, 401, 444–446, 448, 449; 211/181.1; 426/509, 523

(56) References Cited

U.S. PATENT DOCUMENTS

| | | | | |
|---|---|---|---|---|
| 1,339,625 A | * | 5/1920 | Holloway | 99/345 |
| 1,969,601 A | * | 8/1934 | Foch | 99/419 |
| 2,111,456 A | * | 3/1938 | Markle, Jr. | 99/419 |
| 2,350,623 A | * | 6/1944 | Kruea | 99/345 |
| 3,713,378 A | * | 1/1973 | West et al. | 99/346 |
| 3,922,960 A | * | 12/1975 | Lewis | 99/346 |
| 4,066,010 A | * | 1/1978 | Larsson | 99/346 |
| 4,633,773 A | * | 1/1987 | Jay | 99/426 |
| 4,709,626 A | * | 12/1987 | Hamlyn | 99/426 |
| 5,069,117 A | * | 12/1991 | Schlessel | 99/419 |
| 5,301,602 A | | 4/1994 | Ryczek | 99/345 |
| 5,575,198 A | * | 11/1996 | Lowery | 99/426 |
| 5,893,320 A | * | 4/1999 | Demaree | 99/419 |
| 6,125,739 A | * | 10/2000 | Jernigan | 99/345 |
| 6,192,792 B1 | | 2/2001 | Gremillion | 99/426 |

* cited by examiner

Primary Examiner—Timothy F. Simone
(74) Attorney, Agent, or Firm—Joseph N. Breaux

(57) ABSTRACT

A cooking system that includes a pan having a vapor forming tube, a food item support structure securable to the vapor forming tube, and a kabob/basting structure having a food item support platform, a number of spaced kabob/basting material supports and a food item support platform support structure.

1 Claim, 4 Drawing Sheets

_US 6,502,503 B1_

COOKING SYSTEM

TECHNICAL FIELD

The present invention relates to roasting pans and apparatus and more particularly to a cooking system for cooking one or more food items that includes a pan having a bottom surface from which a vapor forming tube extends, the vapor forming tube having a liquid retaining cavity for retaining a volume of a vapor forming liquid therein and a vapor release opening for releasing vapor formed from vapor forming liquids retained within the liquid retaining cavity when the vapor forming tube is subject to heat from a cooking appliance; a food item support structure securable to the vapor forming tube in a manner such that a food item supported by the food item support structure is partially exposed to vapor emitted from the vapor release opening of the vapor forming tube; and a kabob/basting structure having a food item support platform positionable over the vapor forming tube, a number of spaced kabob/basting material supports radiating outwardly and rigidly connected to the food item support platform, and a food item support platform support structure adapted for maintaining the food item support platform above a bottom surface of the bottom surface of the pan and to be positionable in connection with a food item to be cooked and in connection with the vapor forming tube in a manner such that a number of the spaced kabob/basting material supports are maintained above a section of the food item to be cooked such that basting material held on the number of the spaced kabob/basting material supports may drip down onto a portion of the food item to be cooked.

BACKGROUND ART

There are many cooking methods that may be used to cook meat type food items, such as poultry, while also cooking other food items such as vegetables, potatoes, etc. One particularly desirable method of cooking poultry is to provide an open-topped, liquid filled container, positioning the open-topped, liquid filled container into the body cavity of the bird to be cooked and to then cook the bird, such as by roasting in an oven, smoking on a barbeque, or other cooking method, while the bird is supported such that the open topped container is maintained in a vertical orientation. Because it may be difficult to maintain the bird in such a position during the entire cooking process, it would be desirable to have a cooking system adapted for such a cooking process. Because poultry cooked in the above manner often benefits from basting during the cooking process, it would be a further benefit to have such a cooking system that also included a structure for holding basting materials, such as chunks of fat, slices of bacon, etc. so that as the basting material dripped, the drips would fall onto the bird being cooked to provide an automatic basting mechanism.

GENERAL SUMMARY DISCUSSION OF INVENTION

It is thus an object of the invention to provide a cooking system that includes a pan having a bottom surface from which a vapor forming tube extends, the vapor forming tube having a liquid retaining cavity for retaining a volume of a vapor forming liquid therein and a vapor release opening for releasing vapor formed from vapor forming liquids retained within the liquid retaining cavity when the vapor forming tube is subject to heat from a cooking appliance; a food item support structure securable to the vapor forming tube in a manner such that a food item supported by the food item support structure is partially exposed to vapor emitted from the vapor release opening of the vapor forming tube; and a kabob/basting structure having a food item support platform positionable over the vapor forming tube, a number of spaced kabob/basting material supports radiating outwardly and rigidly connected to the food item support platform, and a food item support platform support structure adapted for maintaining the food item support platform above a bottom surface of the bottom surface of the pan and to be positionable in connection with a food item to be cooked and in connection with the vapor forming tube in a manner such that a number of the spaced kabob/basting material supports are maintained above a section of the food item to be cooked such that basting material held on the number of the spaced kabob/basting material supports may drip down onto a portion of the food item to be cooked.

Accordingly, a cooking system is provided. The cooking system includes a pan having a bottom surface from which a vapor forming tube extends, the vapor forming tube having a liquid retaining cavity for retaining a volume of a vapor forming liquid therein and a vapor release opening for releasing vapor formed from vapor forming liquids retained within the liquid retaining cavity when the vapor forming tube is subject to heat from a cooking appliance; a food item support structure securable to the vapor forming tube in a manner such that a food item supported by the food item support structure is partially exposed to vapor emitted from the vapor release opening of the vapor forming tube; and a kabob/basting structure having a food item support platform positionable over the vapor forming tube, a number of spaced kabob/basting material supports radiating outwardly and rigidly connected to the food item support platform, and a food item support platform support structure adapted for maintaining the food item support platform above a bottom surface of the bottom surface of the pan and to be positionable in connection with a food item to be cooked and in connection with the vapor forming tube in a manner such that a number of the spaced kabob/basting material supports are maintained above a section of the food item to be cooked such that basting material held on the number of the spaced kabob/basting material supports may drip down onto a portion of the food item to be cooked.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
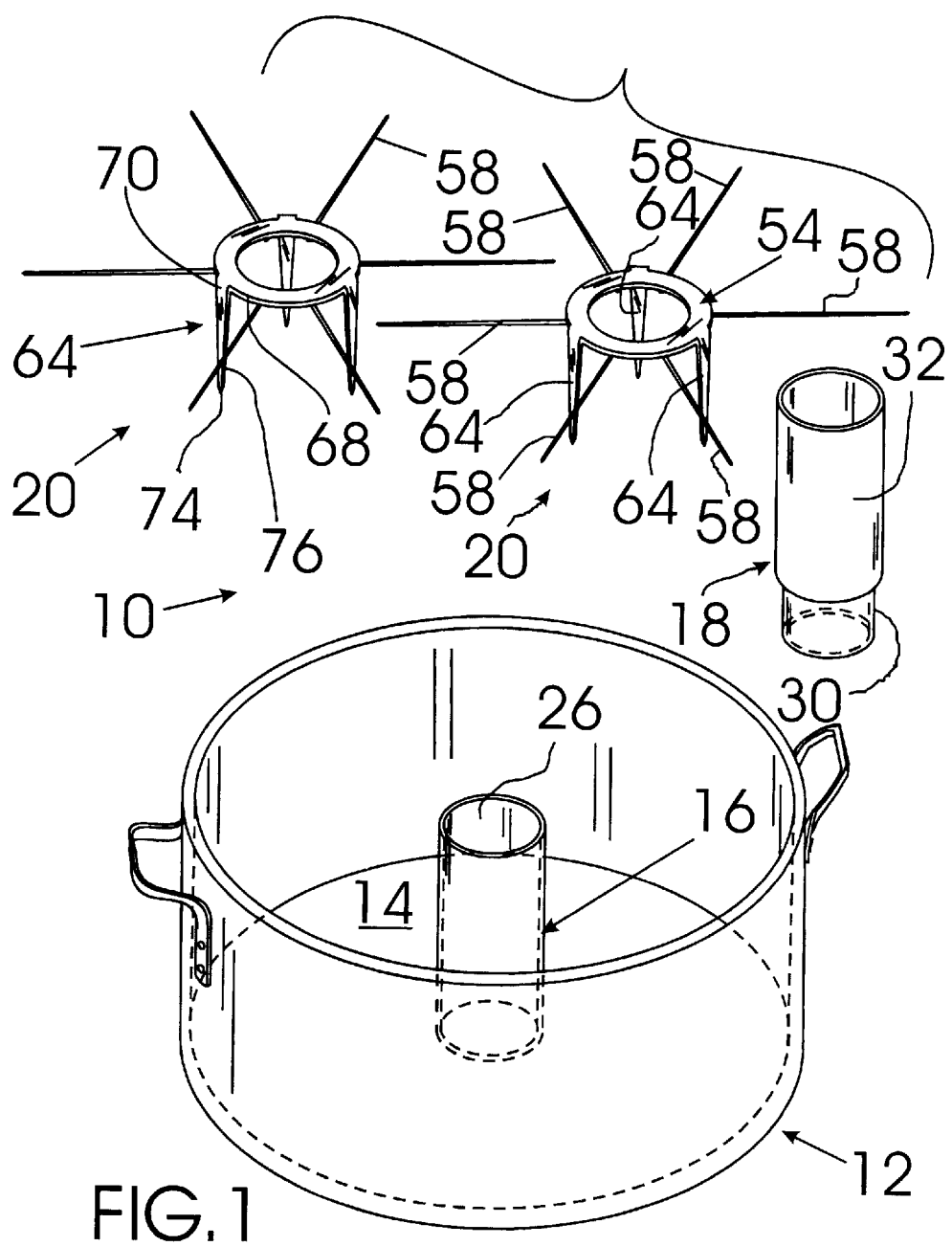
FIG. 1 is a perspective view of an exemplary embodiment of the cooking system of the present invention showing an exemplary embodiment of the pan with vapor forming tube, an exemplary embodiment of the food item support structure, and two identical embodiments of the kabob/basting structure.
Figure 2:
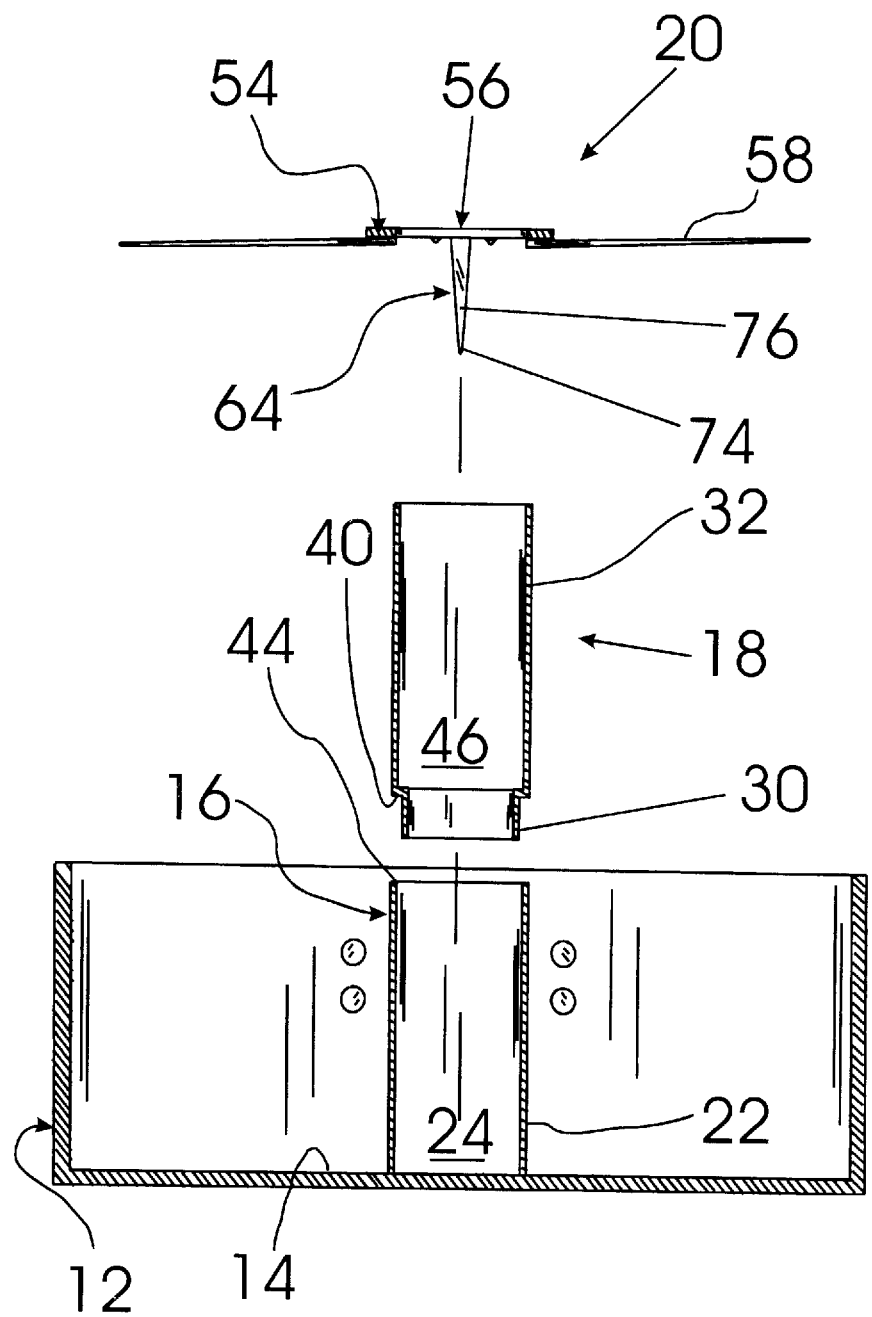
FIG. 2 is a cross section view of the pan with vapor forming tube, the food item support structure, and one of the two identical kabob/basting structures of the cooking system of FIG. 1.

FIGS. 1–4 shows various aspects of a first exemplary embodiment of the cooking system of the present invention generally designated 10. Cooking system 10 includes an aluminum pan, generally designated 12, having an internal bottom surface 14 from which an aluminum vapor forming tube, generally designated 16 extends; a tubular food item support structure, generally designated 18, securable to the vapor forming tube 16, and two, identical, kabob/basting structures, each generally designated 20.

Vapor forming tube 16 is formed from a section of aluminum tubing that has a bottom end 22 welded to internal bottom surface 14 to form a liquid retaining cavity 24 for retaining a volume of a vapor forming liquid therein, such as water, wine or beer mixed with spices and herbs, and a circular vapor release top opening 26 for releasing spiced vapors formed from the boiling of the vapor forming liquids when the vapor forming tube 16 is subject to heat from a cooking appliance such as a range top, oven or barbeque grill.

In this embodiment, food item support structure 18 is formed from two sections of aluminum tubing rigidly secured together to form an insert portion 30 sized to fit into liquid retaining cavity 24 through circular vapor release top opening 26 and a support portion 32 having a bottom ledge 40 sized and shaped to seat on the top edge 44 of vapor forming tube 16. Food item support structure 18 has a tubular passageway 46 to allow the flavor carrying vapor 49 formed in the vapor forming tube 16 to flow through food item support structure 18 and into the food item being cooked such as the chicken, generally designated 50.

Each kabob/basting structure 20 has a washer-shaped food item support platform, generally designated 54, with a circular center opening 56 sized such that washer-shaped food item support platform 54 is positionable over the vapor forming tube 16; six spaced kabob/basting material supports 58 radiating outwardly and rigidly connected to the washer-shaped food item support platform 54; and a washer-shaped food item support platform support structure, generally designated 60, in the form of three spaced support prongs 64 that extend down from and are integrally formed with an outer edge 68 of washer-shaped food item support platform 54. Each support prong tapers from a broad top end 70 to a pointed insertion tip 74 at a bottom end 76 thereof. Although multiple support prongs 64 are used as the washer-shaped food item support platform support structure 60, it should be understood that equivalent structures, such as a tube shaped section, could be used without departing from the invention disclosed herein.

Figure 3:
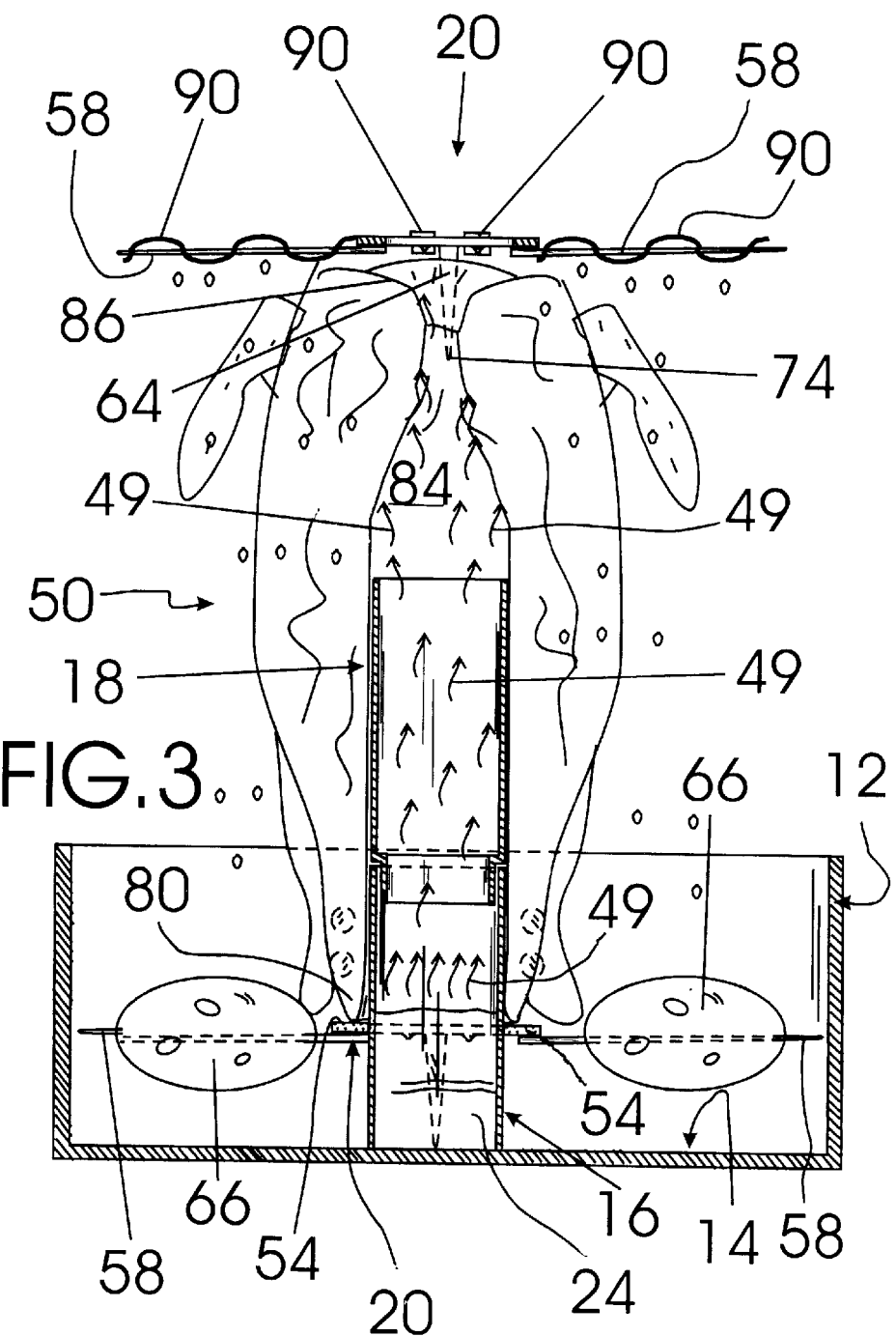
FIG. 3 is a cross section view showing the vapor forming tube and the food item support structure of FIG. 1 positioned within a body cavity of a representative chicken, a quantity of flavored liquid contained within the vapor forming tube, one of the kabob/basting structures positioned in a manner to support the representative chicken being cooked as well as accompanying potatoes, and the second kabob/basting structure with the food item insertion spikes inserted into the top of the chicken carcass and bacon strips secured onto a number of the spaced kabob/basting material supports in a manner such that, as the bacon cooks, bacon dripping drop onto and baste the exterior of the chicken as the chicken is roasted in an oven.

In use, the three spaced support prongs 64 of one kabob/basting structure 20 is used to maintain the washer-shaped food item support platform 54 above the internal bottom surface 14 of pan 12. Washer-shaped food item support platform 54 supports the bottom 80 of chicken 50 while food item support structure 18 and vapor forming tube 16 are positioned within and support the body cavity 84 of Chicken 50. As shown in FIG. 3, kabob/basting material supports 58 may be used to support potatoes 66 or other accompanying food items to be served with chicken 50.

FIG. 3 also the second kabob/basting structure 20 with pointed insertion tip 74 of the three spaced support prongs 64 inserted into the top 86 of chicken 50 and bacon strips 90 skewered on each of the kabob/basting material supports 58. If desired, an onion or other seasoning element, such as a bell pepper or the like may be supported above chicken 50 on washer-shaped, food item support platform 54 such that as juices drip from the onion, bell pepper or other seasoning item, the juices fall into the body cavity 84 of chicken 50.

Figure 4:
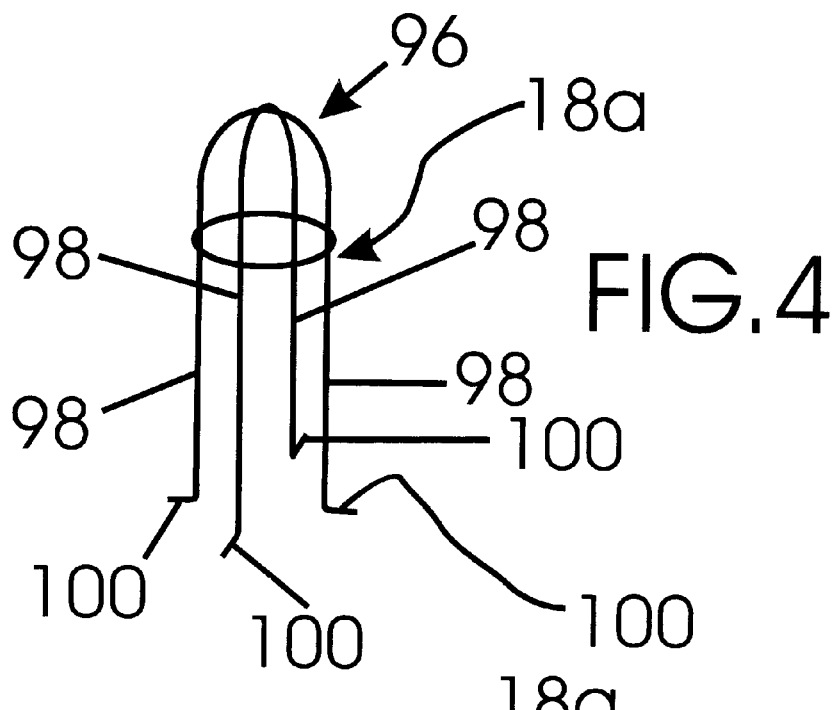
FIG. 4 is a perspective view of a second exemplary embodiment of the food item support structure of cooking system of the present invention formed from multiple bent wire sections welded together.
Figure 5:
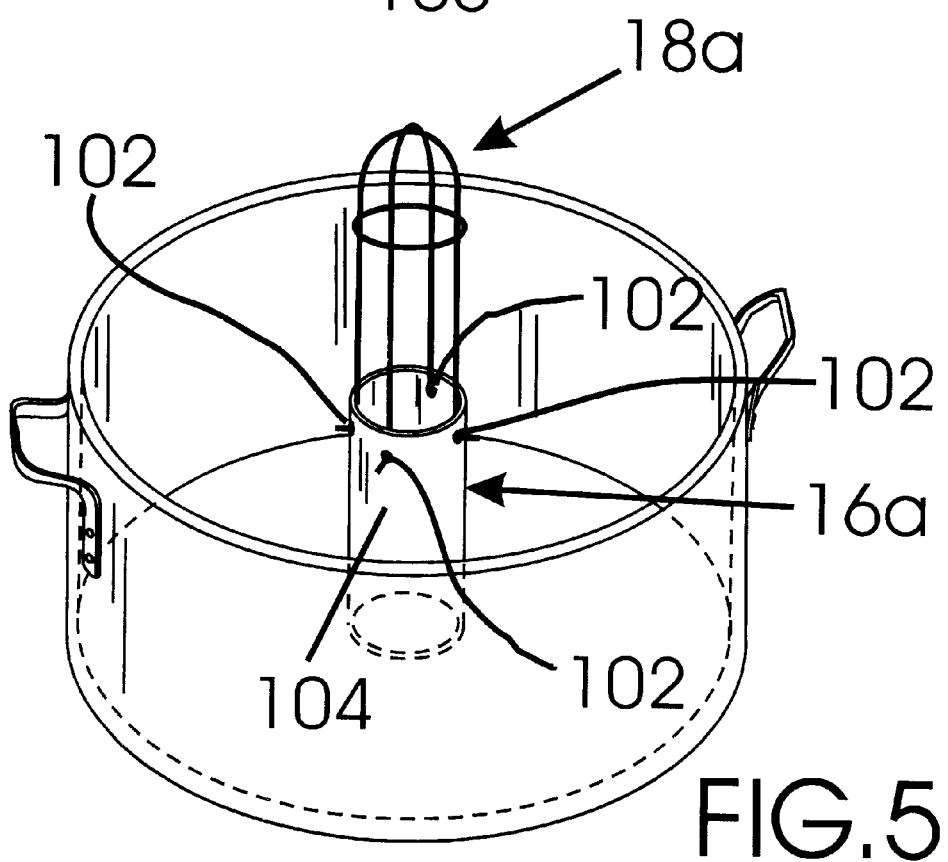
FIG. 5 is a perspective view of the food item support structure of FIG. 4 attached to a second exemplary pan with vapor forming tube of the cooking system of the present invention; the second exemplary pan with vapor forming tube being identical in construction to the first exemplary pan with vapor forming tube except for apertures formed through the top tube end of the vapor forming tube for receiving the attachment structures of the second exemplary food item support structure of FIG. 4.

FIGS. 4 and 5 show a second exemplary embodiment of the food item support structure 18a that is constructed from sections of bent metal wire that have been welded together to form a support cage 96 supported on multiple legs 98 each of which has an outwardly bent tip end to form a vapor forming tube connecting structure 100 at the bottom end thereof. In this embodiment vapor forming tube 16a is identical to vapor forming tube 16 except that multiple connecting structure receiving apertures 102 are formed through a top portion 104 thereof.

It can be seen from the preceding description that a cooking system has been provided.

It is noted that the embodiment of the cooking system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cooking system comprising:
 a pan having a vapor forming tube;
 a food item support structure securable to the vapor forming tube; and
 a kabob/basting structure having a food item support platform, a number of spaced kabob/basting material supports and a food item support platform support structure;
 the pan having a bottom surface from which the vapor forming tube extends;
 the vapor forming tube having a liquid retaining cavity for retaining a volume of a vapor forming liquid therein and a vapor release opening for releasing vapor formed from vapor forming liquids retained within the liquid retaining cavity when the vapor forming tube is subject to heat from a cooking appliance;
 the food item support structure being securable to the vapor forming tube in a manner such that a food item supported by the food item support structure is partially exposed to vapor emitted from the vapor release opening of the vapor forming tube;

the kabob/basting structure having a washer-shaped food item support platform having a circular opening formed therethrough such that the washer-shaped food item support platform is positionable over the vapor forming tube, a number of spaced kabob/basting material supports radiating outwardly and rigidly connected to the washer-shaped food item support platform, and a food item support platform support structure adapted for maintaining the washer-shaped food item support platform above a bottom surface of the bottom surface of the pan and to be positionable in connection with a food item to be cooked and in connection with the vapor forming tube in a manner such that a number of the spaced kabob/basting material supports are maintained above a section of the food item to be cooked such that basting material held on the number of the spaced kabob/basting material supports may drip down onto a portion of the food item to be cooked;

the food item support platform support structure including multiple spaced support prongs;

each multiple spaced support prong including a pointed insertion tip at a bottom end thereof;

each multiple spaced support prong being integrally formed with an outer edge of the washer-shaped food item support platform;

each multiple spaced support prong tapering from a broad top end to the pointed insertion tip at the bottom end thereof.

* * * * *